Oct. 16, 1928.  
F. P. GLOSH  
1,687,721  
SPEED CHANGING MECHANISM  
Filed Sept. 3, 1925  
2 Sheets-Sheet 1
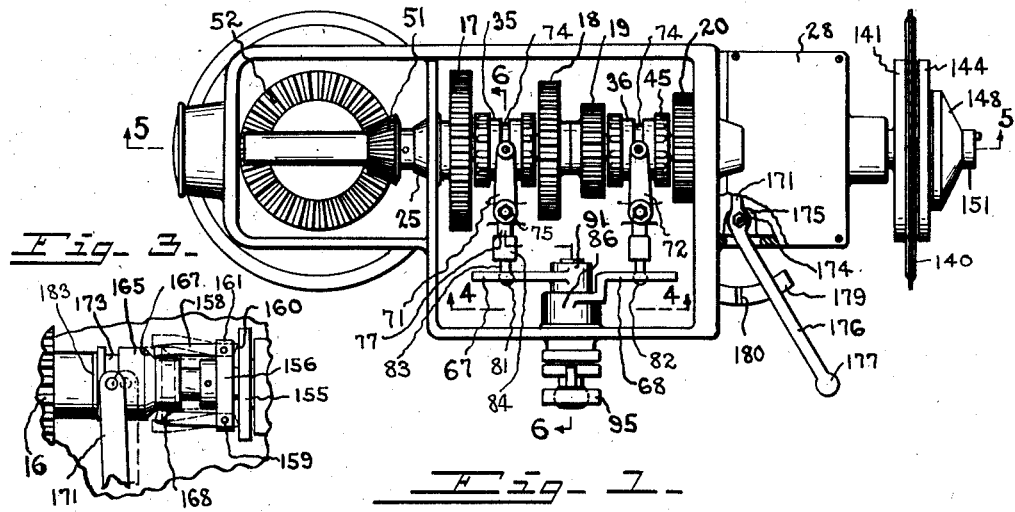
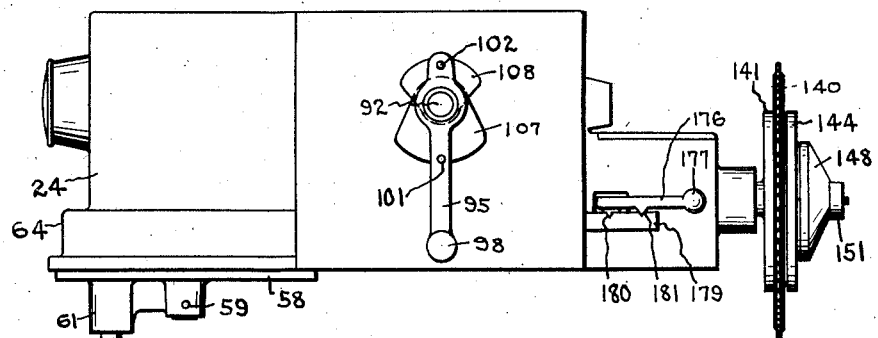
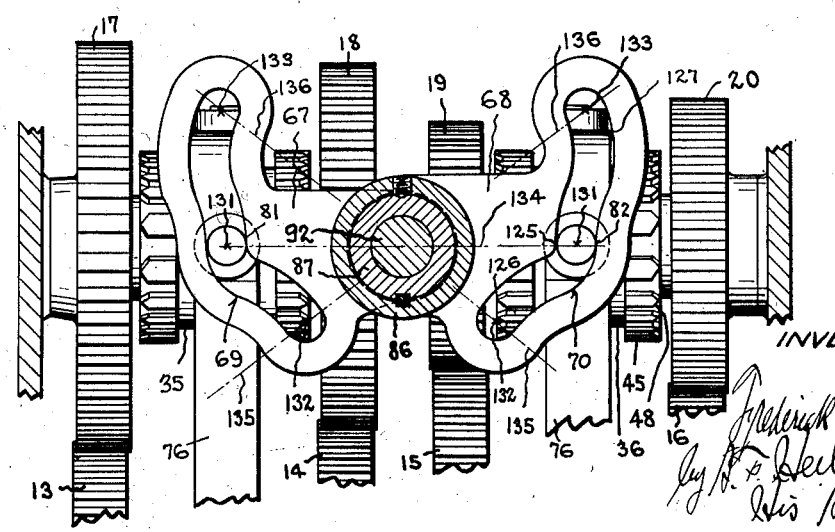

Oct. 16, 1928.  
F. P. GLOSH  
1,687,721  
SPEED CHANGING MECHANISM  
Filed Sept. 3, 1925 2 Sheets-Sheet 2
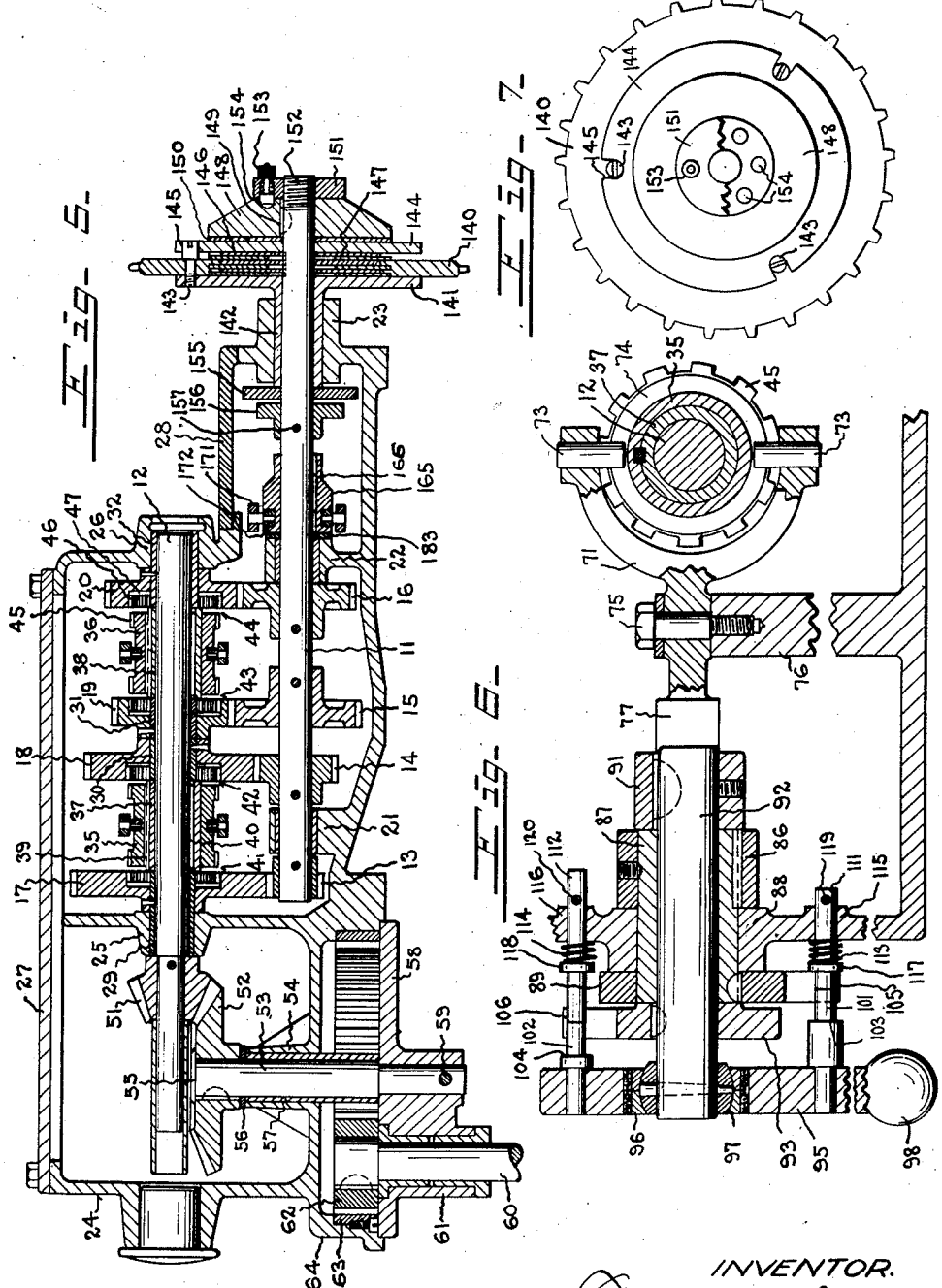
INVENTOR.

Patented Oct. 16, 1928.

1,687,721

UNITED STATES PATENT OFFICE.

FREDERICK P. GLOSH, OF CINCINNATI, OHIO, ASSIGNOR TO THE TRIUMPH MANUFACTURING COMPANY, OF CINCINNATI, OHIO, A CORPORATION OF OHIO.

SPEED-CHANGING MECHANISM.

Application filed September 3, 1925. Serial No. 54,375.

It is the object of my invention to provide novel speed changing mechanism in which the gears for effecting speed change are in continuous mesh, the speed changes being effected by clutch devices operatively connecting respective gears to their shafts for transmitting the changes of speed; further, to provide novel means for effecting engagement and disengagement respectively in the clutches; further, to provide novel means for operating the clutches comprising rotary devices so connected and operating as to transmute the rotary motion at the operating end into linear motion at the clutches; further, to provide novel means for selectively operating the clutches; further, to provide novel means whereby to operate a selective one of the clutches during locked relation of others of the clutches; and, further, to provide novel means for connecting the power applying device with the speed changing devices and for interrupting the rotation in the speed changing devices for readily changing speed in the latter.

My improved device is applicable in various relations, and I have shown the same as employed for driving the upright beater shaft in a so-called mixing machine in the bakers' art.

The invention will be further readily understood from the following description and claims, and from the drawings, in which latter:

Fig. 1 is a side elevation of my improved device.

Fig. 2 is a plan view of the same, with the cover removed for exposure of the interior of the casing.

Fig. 3 is a plan view of the shifting means for the drive clutch, partly broken away, and showing the clutch actuating levers in assumed position in dotted lines.

Fig. 4 is a vertical section of my improved device, taken on the line 4—4 of Fig. 2.

Fig. 5 is a vertical axial section of my improved device, taken in the plane of the line 5—5 of Fig. 2.

Fig. 6 is a vertical cross-section of my improved device, taken in the plane of the irregular line 6—6 of Fig. 2; and, Fig. 7 is an end elevational detail, partly broken away, showing the adjusting means for the drive clutch.

The speed changing mechanism is exemplified as comprising a pair of parallel shafts 11, 12. Pairs of gears 13, 14 and 15, 16, have their respective gears fixed so as to rotate together. The gears of pairs of gears 17, 18, and 19, 20, are respectively normally loose about their shaft, and are in continuous mesh with the gears 13, 14, and 15, 16, respectively. The respective first-named pairs of gears 13, 14, and 15, 16, are exemplified as fixed to the shaft 11, represented as the drive-shaft, and the gears of the respective pairs of gears 17, 18, and 19, 20, are exemplified as rotatable loosely about the other shaft 12, exemplified as the driven shaft.

The shaft 11 is rotatable in bearings 21, 22, 23, of a casing 24, and the shaft 12 is exemplified as rotatable in bearings 25 and 26 in said casing. The shafts are shown in superposed relation in said casing. The gears on the shaft 11 are shown secured to said shaft by pins. The casing is provided with covers 27 and 28.

The gears on the shaft 12 are arranged to be selectively fixed to said shaft by suitable clutches. They are also held endwise with relation to said shaft. Thus the gear 17 is fixed to a bushing 29 therein, the gear 18 is fixed to a bushing 30, the gear 19 is fixed to a bushing 31, and the gear 20 is fixed to a bushing 32, as by pins. The bushings 29, 32, also extend into the bearings 25, 26.

Clutch-collars 35 and 36 are located between the gears of the respective pairs of gears about spacing sleeves 37, 38, the said clutch-collars being slidable axially on said sleeves but held rotatively thereto as by spline-groove and key connections 39, and the said sleeves are fixed to said shaft, as by keys 40. All of said bushings and sleeves have end contact with one another, and the gears 17, 20, have end contact with relation to the bearings 25, 26, so as to fix the endwise relations between said gears.

Clutches 41, 42, 43, 44, are located between said respective clutch-collars and the gears of the respective pairs of gears. These clutches are shown as tooth-clutches, the respective clutches being formed by external teeth 45 on the clutch-collar and by internal teeth 46 on the gear in recesses 47 in said gears. The proximate ends of the teeth may be beveled, as at 48, for ready passage when engaging the clutches.

A bevel-pinion 51 is fixed to the shaft 12, and meshes a bevel-gear 52 fixed to a shaft 53, journaled in a bearing 54, said shaft being provided with a flange 55 which rests on the bevel-gear, the bevel-gear resting on a washer 56, which rests on the bearing 54, in which latter a bushing 57 about the shaft 53 is located.

A plate 58 is fixed to the shaft 53, so as to rotate therewith and be supported thereby, as by a pin 59. A shaft 60 which may be the beater-shaft of a mixing or kitchen machine, is journaled in a bearing 61 in said plate and has a pinion 62 fixed thereto. The pinion 62 meshes with an internal gear 63 fixed in a housing 64 of the casing. The rotation of the shaft 53 carries the plate 58 with it, and causes the shaft 60 to revolve planetwise about the shaft 53, whereby the pinion 62 revolves planetwise and in mesh with the internal gear 63, for causing the beater shaft 60 to rotate and to revolve planetwise about the axis of said plate. This exemplification is stated as a mechanism which may be operated by my improved speed changing device.

The means for engaging and disengaging the clutches are exemplified as cam-plates 67, 68, provided with cams 69, 70, and arranged to be separately shifted for actuating one or the other of the clutch-collars in either direction, one of the clutches only being in engaged relation at any one time, and both clutch-collars being arranged to be placed in neutral relation for cessation of transmission of power.

Forks 71, 72, are provided with pins 73, received in annular grooves 74, in the respective clutch-collars. Each of the forks is pivoted at 75 to a lug 76 in the casing, for instance by means of a shoulder-bolt received through a bearing in the shank 77 of said fork and threaded into said lug.

The shanks of said forks are provided with articulating parts 81, 82, preferably of ball form, received in the cam-grooves 69, 70. Each of said articulating parts is provided with a shank 83, as a continuation of the shank 77, and fixed in a socket 84 in the shank of the fork.

The cam-plate 68 is provided with a hub 86, fixed to a rock-sleeve 87, the said sleeve being journaled in a bearing 88 in the casing, and having an operating part 89 secured thereto.

The cam-plate 67 is provided with a hub 91 fixed rotatively and endwise to a rock-shaft 92, journaled in the rock-sleeve 87. An operating part 93 is fixed to the other end of said shaft. The rock-shaft and the rock-sleeve as well as the cam-plates and their bearings and the operating parts are held in endwise relation to each other.

An operating lever 95 is pivoted on the rock-shaft, so as to be rockable in a plane parallel with said shaft and in a plane at substantially right angles thereto. Thus the operating lever is provided with a bearing 96, and the rock-shaft is provided with a rounded outer end 97 complemental thereto, for forming a ball and socket joint between said rock-shaft and said operating lever, for causing shifting of the speed changing clutches.

The operating lever is provided with a handle 98. The operating lever is at opposite sides of its bearing provided with knobs 101, 102, fixed thereto, and preferably having shoulders 103, 104. The operating parts 89, 93, are provided with apertures 105, 106, respectively shown as slots, in which said respective knobs are arranged to be received. Said operating parts are respectively provided with wings 107, 108, upon which the respective knobs 101, 102, are arranged to rest, and along which said respective knobs may move, when one of said knobs has been moved into the aperture in one of said operating parts and the other of said knobs has consequently been moved outwardly from the aperture of the other of said operating parts, and movement of the operating lever transverse to the rockable shaft has caused rotation of the operating part in which said knob is located.

When one of said knobs has been moved into one of said apertures, whereby the other of said knobs is moved out of the other of said apertures, by swinging of said operating lever in either direction endwise of the rock-shaft, and the operating lever has been moved transverse to the axis of said rock-shaft, whereby the operating part in whose aperture the knob is located, is also moved transverse to the axis of said rock-shaft, the other of said knobs, which is not in its aperture, will be placed at the outer face of one of the wings of the other operating part which has not thus been shifted laterally. This relation of parts continues until the lever is returned to neutral position, whereupon the springs 113, 114, act in causing all the knobs to be received in their apertures.

This places said other of said knobs out of the range of said last-named aperture, so that only one of said operating parts and, consequently, only one of said cams can be moved at a time, in order to insure that only one of said clutches shall be engaged at a time.

The operating lever must be brought back to neutral position, represented as a depending position, to again place the other of its knobs in registry with the last-named aperture, before movement of the other of the operating parts may be effected.

By these means only one of the operating or safety plates may be moved in one direction at a time, for engaging only one of the clutches, and the engaged clutch must be first returned to neutral position, prior to possibility of shifting of any other clutch for engagement.

I have also provided means whereby the operating parts are locked in neutral relations. For this purpose I provide latches 111, 112, normally received in the apertures 105, 106, and urged into said apertures by springs 113, 114, located between bearings 115, 116, and collars 117, 118, on said respective latches. The latches are arranged to move axially in said bearings, and their outward movements are preferably limited by pins 119, 120.

When either of the knobs 101, 102, is moved into its aperture, it simultaneously pushes the locking latch out of said aperture. When said latch has been pushed out of said aperture, the operating or safety plate, into which the knob on the operating lever has been advanced, may be moved laterally, while the other of said latches maintains its locked relation with the other of said operating or safety plates. The latch which has thus been pushed out of its aperture, will upon lateral movement of the safety plate, ride upon the rear face of said plate, ready to again enter said aperture when the aperture is brought into registry therewith. The movement of either of said operating or safety plates causes a corresponding movement of the cam-plate complemental thereto.

Each of the cam-slots comprises a neutral portion 125, an inner portion 126, extending toward the pivotal axes of the cam plates, and outer portions 127 extending away from said pivotal axes. The inner cam portions, which extend toward the pivotal axes of the cam-plates, have an increasing leverage, and are consequently shorter, while the outer cam portions, which extend outwardly, have a decreasing leverage, and are consequently longer. The extent of operative movement of the operating lever and the power required therefor is however the same for effecting clutch engagement and disengagement, regardless of the direction in which the clutch-collars are moved, and regardless of which clutch-collar is moved.

Thus referring to Fig. 4, the normal position of the axis of the articulation between the cam-plate and the clutch-lever is exemplified at 131. The position of said axis in the cam-slot, when the outer clutch 44 is engaged, is exemplified at 132, and the position of said axis in said cam-slot, when the inner clutch 43 is engaged, is exemplified at 133. The angular distance between the neutral position of the axis at 131 and the positions of said axis for engagement of either clutch is, however, the same, as exemplified by the dot and dash lines 134, 135, 136, which intersect the pivotal axes of the cam-plates and said axes of said articulation at the neutral position and the extreme positions of the latter.

The driving means for the speed changing mechanism may include a sprocket-wheel 140, about which a suitable sprocket-chain may be received from a similar sprocket-wheel on a suitable electric motor suitably placed. The sprocket-wheel is shown secured to a plate 141, provided with a hub 142, journaled in the bearing 23, the shaft 11 being received through said hub, the latter shaft being rotatable with or in said hub.

The sprocket-wheel may be clamped to said plate by means of bolts 143. A plate 144 is received about said shaft and is provided with holes 145 in which the heads of said bolts are received. Friction-plates 146, 147, are located between the plates 141, 144. The friction-plates 146 are suitably keyed to the sprocket-wheel, and rotate with said plates and sprocket-wheel, and the friction-plates 147 are suitably keyed to the shaft 11 and rotate with said shaft. When said friction-plates are pressed toward each other they rotate in unison for transmitting the rotative power between said hub and said shaft. This may be effected by providing a block 148, fixed to rotate with said shaft, as by a spline groove and key connection 149, to permit axial movement between the shaft and the block for adjustment. A friction plate 150 is located between the block and the plate 144. The adjustment may be accomplished by a nut 151, having threaded connection 152 with the shaft, and provided with a spring-pressed pull-pin 153, the inner end of which is arranged to be selectively placed in holes 154 in said block, for maintaining the adjusted position between said nut and said block.

An end abutment plate 155 is received about said shaft and abuts against the end of the hub 142. A collar 156 is fixed to said shaft, as by a pin 157. Clamp-levers 158 are pivoted to said collar on pins 159, and have abutments 160, arranged to engage the abutment plate 155. A suitable number of these levers are pivoted about the collar in slots 161 in the collar.

A frusto-conical collar 165 is slidable endwise on the shaft, and is rotatable therewith by a spline groove and key connection 166. This collar is provided with a frusto-conical face, arranged to engage the ends of the clamp-levers, for spreading the latter, when the frusto-conical collar is moved endwise toward the collar 156. The frusto-conical collar may be provided with a cylindrical face 167 received within the faces 168 on the clamp-levers. These latter faces are parallel with the cylindrical face 167 when said levers are spread to desired extent for clamping the clutch faces of the drive clutch together with sufficient force, this force being adjusted by means of the nut 151.

The means for operating the frusto-conical collar is shown as a fork 171, provided with pins on which rollers 172 are located, received in an annular groove 173, in said frusto-conical collar, the fork being pivoted on a shoulder-bolt 174 threaded into a lug 175 in the casing, and having an operating arm 176 on which there is a handle 177 for operating said fork.

When the operating handle 177 is moved for causing clamping movement of the clamping-levers, pressure is brought to bear by the clamping levers upon the end abutment plate 155, which moves the hub 142 endwise and causes endwise pressure thereon for moving the plate 141 toward the block 148 and clamping the friction-plates between the plate 141 and the block 148. To hold the operating arm for clutch engagement or brake engagement, a lug 179 extending from the casing may be provided with notches 180, 181, in which a lug on the operating arm may be received.

When the drive-clutch is to be disengaged, the frusto-conical collar is moved axially in the opposite direction and is caused to engage a brake-washer 183, abutting against the end of the bearing 22, whereby the rotation of the shaft 11 is decreased in speed or is stopped, thereby decreasing the speed of the gears and the relative rotation between the clutch-teeth of the respective clutches, or causing cessation of said rotations, for permitting ready reengagement of the teeth of other clutches for changing speed.

In operation when changing speed from one speed to another speed, the drive-clutch is first disengaged and its brake caused to act for decreasing the speed or causing cessation of rotation of the gears, whereupon the speed changing clutch in engagement is released, and another of the speed changing clutches for the speed desired is engaged, which can be done with ease of manipulation, whereupon the drive-brake is again disengaged and the drive-clutch engaged by movement of the operating handle 177 in the opposite direction.

When one of the speed changing clutches is in engagement, the corresponding operating knob is in its aperture in the corresponding operating plate and the opposite operating knob is obstructed by the front face of one of the safety wings of the other operating plate, which other operating plate is locked in position by its latch, whereas the latch for the first-named or operated operating plate has been pushed out of its aperture and rides upon the rear face of said first-named operating plate.

If now it is desired to change speed, for instance requiring movement of the other operating plate, it is first necessary to bring the operating lever for speed change back to neutral position, in which position both the operating knobs and both the latches are in registry with the apertures on both the operating plates. The operating lever for speed change is then swung in the direction of the axis of the rock-shaft, which moves the operating knob which has been in its aperture out of said aperture and causes the latch to snap into said aperture for locking said operating part.

The further swinging of this operating lever for speed change in the same direction causes its opposite operating knob to enter the aperture in the other operating plate and to move the latch for said other operating plate out of said aperture, for permitting said other operating plate to be moved about the axis of said rock-shaft. The operating lever may then be moved laterally for engaging the other desired speed changing clutch.

Having thus fully described my invention, what I claim as new, and desire to secure by Letters Patent, is:

1. In speed changing mechanism, the combination of a pair of movable elements movable in opposite directions for effecting speed changes, a rock-shaft, a rock-sleeve thereabout, said rock-shaft and said rock-sleeve having operative connections with the respective elements of said pair of movable elements, a pair of operating parts for rocking said rock-shaft and said rock-sleeve, an operating lever pivoted on a pivot extending lengthwise of the axis on which said rock-shaft rocks and on a pivot extending at an angle to said axis, said lever located at one side of said operating parts, releasable connecting means between said operating lever and said respective operating parts arranged for operative connection of said lever with each of said operating parts and disconnected relation of said lever with the other of said operating parts upon swinging of said lever on said last-named axis, said operating parts provided with obstructing means with which said connecting means in disconnected relation coact during transverse pivotal movement of said lever, and locking means for said respective operating parts complemental to said respective connecting means.

2. In speed changing mechanism, the combination of a pair of movable elements movable in opposite directions for effecting speed changes, a rock-shaft, a rock-sleeve thereabout, said rock-shaft and said rock-sleeve having operative connections with the respective elements of said pair of movable elements, a pair of operating parts for rocking said rock-shaft and said rock-sleeve, an operating lever pivoted on a pivot extending lengthwise of the axis on which said rock-shaft rocks and on a pivot extending at an angle to said axis, said lever located at one side of said operating parts, releasable connecting means between said operating lever and said respective operating parts arranged for operative connection of said lever with each of said operating parts and disconnected relation of said lever with the other of said operating parts upon swinging of said lever on said last-named axis, said operating parts provided with obstructing means with which said connecting means in disconnected relation coact during transverse pivotal movement of said lever, latching means for said respective operating parts, and means for maintaining said latching means in obstructed relation with the moving operating part during shifting movement of said operating part.

3. In speed changing mechanism, the combination of a pair of elements shiftable for effecting speed changes, a pair of oppositely disposed cam-plates and operating parts therefor having coincident pivotal axes, a lever having a pivotal axis complemental to said first-named axes and a pivotal axis at an angle thereto, said lever provided with operating knobs at opposite sides of said last-named axis arranged for operative connections with said operating parts for moving said respective operating parts, and locking knobs for said respective operating parts complemental to said operating knobs, whereby each of said operating knobs is arranged to release one of said locking knobs.

4. In speed changing mechanism, the combination of a pair of elements shiftable for effecting speed changes, a pair of oppositely disposed cam-plates and operating parts therefor having coincident pivotal axes, a lever having a pivotal axis complemental to said first-named axes and a pivotal axis at an angle thereto, said lever provided with operating knobs at opposite sides of said last-named axis arranged for operative connections with said operating parts for moving said respective operating parts, locking knobs for said respective operating parts complemental to said operating knobs whereby each of said operating knobs is arranged to release one of said locking knobs, and resilient means automatically returning said locking knobs into locking relation upon return to normal positions of said operating parts.

5. In speed changing mechanism, the combination of a pair of elements shiftable for effecting speed changes, a pair of oppositely disposed cam-plates and operating parts therefor having coincident pivotal axes, a lever having a pivotal axis complemental to said first-named axes and a pivotal axis at an angle thereto, said lever provided with operating knobs at opposite sides of said last-named axis, and locking knobs for said respective operating parts complemental to said operating knobs whereby each of said operating knobs is arranged to release one of said locking knobs, said operating parts provided with obstructing means for said locking knobs during shifted relations of said operating parts.

In testimony whereof, I have hereunto signed my name.

FREDERICK P. GLOSH.